United States Patent [19]

Hooke

[11] 4,291,106

[45] Sep. 22, 1981

[54] BATTERY LINKAGE SYSTEM

[75] Inventor: John W. Hooke, Gainesville, Fla.

[73] Assignee: General Electric Company, Gainesville, Fla.

[21] Appl. No.: 153,760

[22] Filed: May 27, 1980

[51] Int. Cl.³ ............................................. H01M 2/20
[52] U.S. Cl. ........................................ 429/1; 429/121; 429/123; 429/158
[58] Field of Search ..................... 429/1, 9, 96–100, 429/123, 156–159, 121

[56] References Cited

U.S. PATENT DOCUMENTS

| 3,341,053 | 9/1967 | Keene | 429/97 X |
| 3,864,172 | 2/1975 | Marks | 429/1 |
| 4,002,808 | 1/1977 | Fafa | 429/157 |
| 4,084,037 | 4/1978 | Morton | 429/1 |

Primary Examiner—Anthony Skapars
Attorney, Agent, or Firm—Morgan, Finnegan, Pine, Foley & Lee

[57] ABSTRACT

In an electrical storage battery composed of a plurality of electrochemical cells, a keyed linkage system provides for the series connection of the cells in a prescribed order. The system includes the cell terminals, which may be in a stud or tab form, a tooth projecting outwardly in each cell between the terminals, and connecting links which are secured to the terminals of adjacent cells. The size, shape, and location of the tooth permits only a given end of the connecting link to be coupled to one of the terminals, for example, the positive terminal, to accomplish the keying function.

18 Claims, 8 Drawing Figures

BATTERY LINKAGE SYSTEM

BACKGROUND OF THE INVENTION

This invention relates to electrochemical cells or batteries and more particularly, to a keying system to insure proper interconnection of battery cells.

Electrochemical cells and batteries are utilized in numerous applications for the storage of electrical energy, the term battery herein referring to a series of cells which are electrically coupled. In one form of battery, electrical connection is made by terminals in the form of a pair of studs protruding from one end of side of the cell. By way of example, these studs may be threaded to permit the securing of a connecting link to the stud by threaded nuts. In an alternative cell, the terminals may take the form of tabs which may be bent to permit a spot welding of a connecting link thereto.

A problem arises in the interconnection of the foregoing cells, particularly in the manufacture of electronic systems requiring the interconnection of a series of the cells to form a battery of increased voltage required to operate the electronic system. Metallic links usually are employed to join the individual cells into a battery by connecting the positive terminal of one cell to the negative terminal of the next cell. In the manipulation of the coupling link by a person assembling the battery, it is not uncommon for a link to inadvertently contact two studs of a single cell with a resulting shorting or possible damage to the cell. Nor is it uncommon for a connection of the link to be made between two positive terminals, or two negative terminals, rendering the battery inoperative. Such misconnections occur because it is all too easy for a worker on a busy production line to make a mistake by erroneously interconnecting two terminals which have identical or similar appearance. Also, it should be appreciated that since interconnecting links are sometimes quite small and thin, they may be difficult to handle. A dropped or misplaced connection can readily contact terminals of the battery and short it out.

SUMMARY OF THE INVENTION

The foregoing problems are overcome and other advantages are provided by a keyed linkage system for batteries having projecting terminals, such as studs and tabs. In accordance with the invention, the keyed linkage system provides for the insertion of a keyed protuberance or tooth between the battery terminals, and a connecting link which is keyed to mate with the shape of the tooth. The tooth is asymmetrically positioned, being closer to one of the two terminals of a cell, and has a height which is sufficient to prevent the simultaneous contacting of a pair of terminals of a single cell by a connecting link. The keying of the link ensures that only one specific end of the link can be joined to a cell terminal of any given polarity.

In a preferred embodiment of the invention, the tooth has a cross-sectional form in the shape of a cross (the polarity designation for the positive terminal). It projects upwardly from the top surface of the cell a distance slightly greater than the projection of the two terminals of the cell, and is spaced closer to the positive terminal. A portion of one leg of the tooth, adjacent the positive terminal, may be deleted or beveled to provide space for the emplacement of a nut-driver tool useful in securing the connecting link to a threaded stud terminal.

The links can assume several forms. In a preferred form for use with cells having threaded stud terminals, the connecting link has an aperture at each end for receiving the terminal and is keyed by shaping one end with a curved edge of relatively large radius about its aperture and by shaping the opposite end with a curved edge of relatively small radius about its aperture. Thereby, the smaller end of the link can be fitted in the relatively small space between the tooth and the positive stud, while the larger end of the link cannot be so secured between the tooth and the positive terminal. Thus, a person assembling a battery of many cells is alerted to the improper orientation of adjacent cells in a series of cells, or of improper connection of the link to one cell before an interconnection of cells is made, since the connecting link cannot be joined to both cells if one end of the link has been misconnected. Also, the link is preferably constructed to a predetermined length which locates the cells close together for connection. In cells of the type having terminals which are of unequal spacing from the cell rim, it becomes impossible to incorrectly join either two positive or two negative terminals of adjacent cells. In the event that an assembler of a battery inadvertently drops one of the connecting links, there is, accordingly, no danger of contacting two terminals of a cell to short the cell because the tooth and link dimensions are such as to prevent the simultaneous touching by the link of two terminals of a cell. Only the correct two terminals of adjacent cells can be contacted by the link.

BRIEF DESCRIPTION OF THE DRAWINGS

The aforementioned features and other aspects of the invention are explained in the following description taken in connection with the accompanying drawings wherein.

DESCRIPTION OF THE PREFERRED EMBODIMENT

Figure 1:
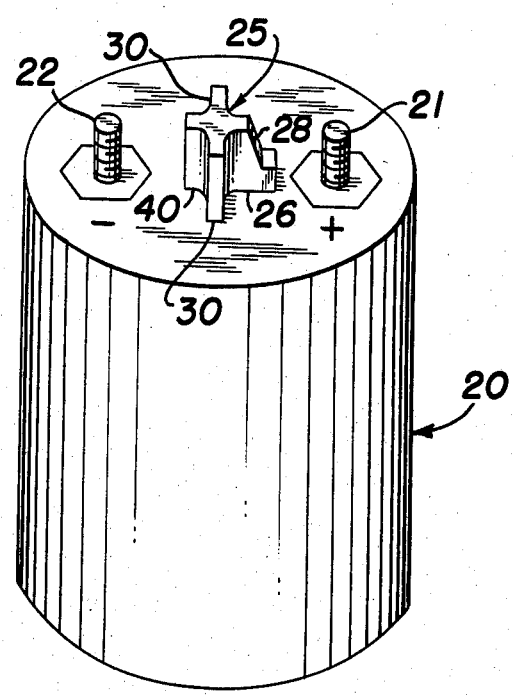
FIG. 1 is an isometric view of a single cell having a pair of threaded stud terminals extending from one end thereof, a keying projection being placed between the terminals in accordance with the invention.

Referring now to FIG. 1, there is seen an electrochemical storage cell 20 having a positive terminal 21 and a negative terminal 22 projecting from an end of the cell 20. The terminals 21–22 are fabricated in the form of threaded studs for receiving a connecting link 23 (seen in FIGS. 2–4) and threaded nuts 24 (seen in FIG.

4) which secure the link 23 to the terminals 21-22 of adjacent cells 20 as will be described hereinafter.

In accordance with the invention, a specially shaped tooth 25 projects from the top of the cell 20 between the terminals 21-22 to a height slightly greater than either of the terminals 21-22. The tooth 25 prevents the simultaneous contact of both the terminals 21-22 with a metallic object, such as the link 23 or a tool (not shown) used in fastening the nuts 24, and thus protects against an inadvertent electrical shorting of the cell 20. The spacing between the tooth 25 relative to the terminals 21-22 is asymmetrical, the tooth 25 in the exemplary cell 20 of FIG. 1 being closer to the positive terminal 21. Due to the asymmetrical spacing, the tooth 25 serves as a key to insure the positioning of the connecting link 23 for a prescribed order of interconnection of the cells 20. The cross sectional shape of the tooth 25 is in the form of a cross having a longer leg 26 adjacent the terminal 21. A portion of the longer leg 26 has been cut away leaving a chamfer 28 to provide space for the insertion of a nut driver tool for securing the connecting link 23 by the nut 24. The side legs 30 of the tooth 25 extend transversely a sufficient distance from a longitudinal plane containing the center lines of the terminals 21-22 to prevent the aforementioned simultaneous contacting of the terminals 21-22 by a metallic object.

Figure 2:
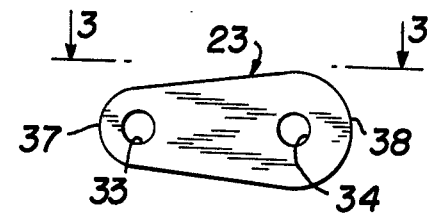
FIGS. 2 and 3 are respectively plan and side elevation views of a connecting link that is keyed in accordance with the invention.
Figure 3:
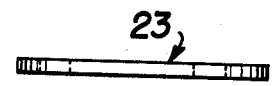

Referring now to FIGS. 2 and 3, there are seen plan and elevation views of the link 23 which is used to electrically connect the terminals of a pair of adjacent cells 20 (as will be seen in FIG. 4), namely, the positive terminal 21 of one of the cells 20 with the negative terminal 22 of the second of the cells 20. The link 23 is provided with apertures 33-34 having a diameter slightly larger than the diameters of the terminals 21-22 to permit insertion of the terminal 21 of the first of the cells 20 through the aperture 23, and insertion of the terminal 22 of the second cell 20 through the aperture 34. The two ends 37-38 of the link 23 are of differing sizes, the end 37 being smaller than the end 38, the end 37 being formed with a radius of curvature which is smaller than the radius of curvature of the large end 38. Thereby, it is seen that the small end 38 can fit in the relatively small space, in FIG. 1, between the end of the leg 26 and the terminal 21 while the end 38 is too large to fit within that small space. The spacing between the short leg 40 of the tooth 25 and the terminal 22 is large enough to accommodate either of the ends 37-38 of the link 23.

Figure 4:
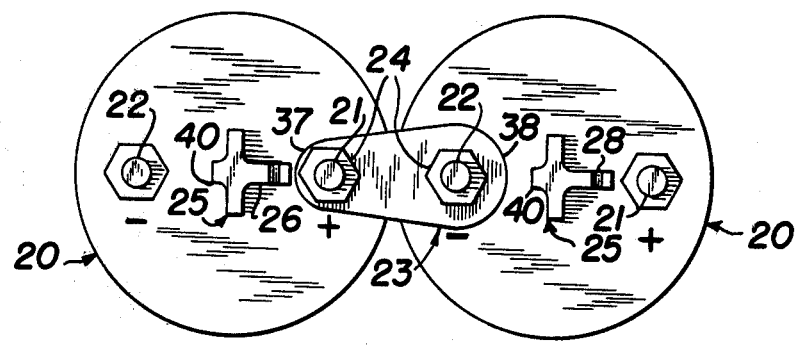
FIG. 4 is a top plan view of a battery comprising a pair of cells, each having the form shown in FIG. 1, wherein a positive terminal of one cell is connected to a negative terminal of the other cell by the link of FIG. 2 in accordance with the invention.

Referring now to FIG. 4, there is seen a series electrical connection between two cells 20 accomplished by means of the link 23 connected between the terminal 21 of the first cell 20 and the terminal 22 of the second of the cells 20. The link 23 is secured by means of the nuts 24 which are threadedly fastened to the terminals 21 and 22. The small end 37 of the link 23 is positioned on the terminal 21 adjacent the chamfer 28 of the tooth 25. The end of the longer leg 26 of the tooth 25 clears the small end 36 of the link 23. The large end 38 of link 23 is seen to clear the short leg 40 of tooth 25 in the second of the cells 20. The periphery of the nut 24 clears the terminus of the longer leg 26; however, a tool (not shown) utilized in tightening the nut 24 requires additional clearance and, accordingly, as was described with reference to FIG. 1, the region of the chamfer 28 in the leg 26 provides clearance for the nut driver tool.

Since the link 23 can be positioned in only one direction between the two cells 20 upon connection to the positive terminal, it is apparent that, in the event of an attempted misconnection of the link to the positive terminal of an adjacent cell, a person assembling the battery would be unable to make a connection error since link 23 would be too close to the tooth 25 to fit onto the terminal 21. As long as the operator person begins by connecting a link to the positive terminal of the first cell, no mistake can be made. Additional safety can be realized if the two termianals are spaced from the cell rim by different distances. In such case it would be impossible to interconnect the link to the negative terminals. But if such a connection were made in a battery of several cells, only one such improper connection could be made.

Figure 5:
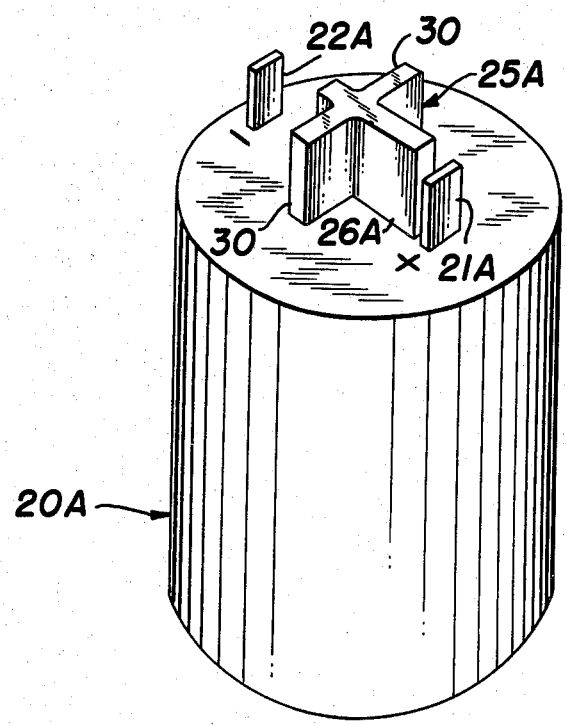
FIG. 5 is a perspective view of an alternate type of cell according to the invention, having bendable tab terminals adapted for spot welding to a connecting link.
Figure 6:
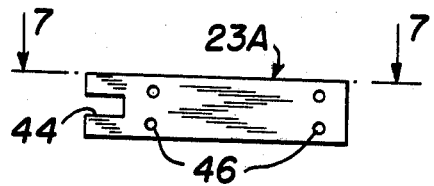
FIGS. 6 and 7 are, respectively, plan and side elevation views of an alternative embodiment of a connecting link for use with the cell of FIG. 5.
Figure 7:
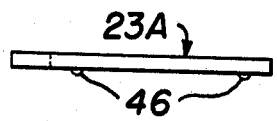

Referring now to FIGS. 5-8, an alternative embodiment of the cell and link previously described is depicted, the cell of FIG. 5 being identified by legend 20A and the connecting link of FIGS. 6 and 7 being identified by the legend 23A. The cell 20A includes terminals 21A and 22A with a tooth 25A spaced therebetween. The arrangement of the terminals 21A-22A and the tooth 25A follows that previously disclosed with reference to the terminals 21-22 and the tooth 24 of FIG. 1. The shape of the leg 26A of FIG. 5 differs from that of the leg 26 in that the sloping surface 28 of the leg 26 is not present. The tooth 25A in this case performs the aforementioned keying function by mating with a slot 44 of the link 23A, the slot 44 being best seen in FIG. 6.

Figure 8:
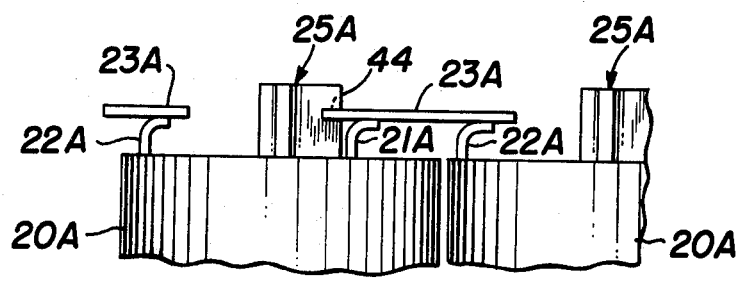
FIG. 8 is a partial side elevation view of a pair of adjacent cells of a battery which are coupled together by the spot welding of the positive terminal of one of the cells to the connecting link of FIG. 6 for connection with the negative terminal of a second of the cells.

The terminals 21A-22A are in the form of tabs which are readily bent horizontally to permit the ends thereof to be spot welded to the ends of the link 23A in the manner shown in FIG. 8. Raised contact points 46 are located at the ends of the link 23A to contact the terminals 21A-22A and provide current-concentrating areas to facilitate the spot welding of the links 23A to the terminals 21A-22A. The spacing of the terminals 21A-22A and the tooth 25A, as well as the configuration of the link 23A, permits the link to be connected to the positive terminal 21A with the longer leg 26A received in the mating slot 44. In the event that the ends of the link 23A are positioned improperly, e.g., reversed, the points 46 adjacent the slot 44 would not contact the terminal 22A and, similarly, the points 46 at the opposite end of the link 23A would not contact the terminal 21A. Thereby, the configuration of the link 23A and of the tooth 25A provides a keying function, such as that described previously in reference to FIGS. 1-4. Similarly, an assembler of a battery of the cells 20A is warned of an incorrect connection of the cells 21A in a series connection thereof.

In the embodiment of FIGS. 5-8, it will be noted that no incorrect or misplaced connection can occur as long as the operator begins by placing the slotted end of the link over leg 26A of the tooth and welds the link to the positive terminal. Once this is done, it is possible to join the link only to the correct, negative, terminal of an adjacent cell.

With respect to the materials utilized in constructing the cells 20 and 20A, it is first noted that the construction of the cells 20 and 20A generally conforms to the commercial sealed lead secondary cells manufactured by General Electric Company. The novel structure of the invention, namely, the keying means comprising the teeth 25 and 25A, is preferably formed integrally with the top cover of the cell 20 or 20A of molded plastic material having electrical insulating properties. A high temperature thermoplastic is preferred, one such thermoplastic being an alloy of polyphenylene oxide and polystyrene manufactured by the General Electric Company under the trade name of Noryl. The link 23 is fabricated of electrically conducting material, such as brass, which is compatible with the brass terminals of the cell 20. The link 23A is fabricated of electrically conducting material such as nickel, stainless steel, or nickel plated steel which can be welded to the tin-plated steel terminals of the cell 20A. The links 23 and 23A are conveniently formed by a stamping operation.

It is to be understood that the above described embodiments of the invention are illustrative only and that modifications thereof may occur to those skilled in the art. Accordingly, the invention is not to be regarded as limited to the embodiments disclosed herein, but is to be limited only as defined by the appended claims.

What is claimed is:

1. A system for joining a plurality of electrochemical cells comprising:
    keying means disposed in each of said cells among the terminals thereof; and
    link means for electrically coupling a terminal of one of said cells with a terminal of a second of said cells, the arrangement of said keying means and said terminals in each of said cells providing for a mating of one end of said link means with a predesignated terminal in one of said cells.

2. A system according to claim 1 wherein said keying means comprises a projecting leg, and wherein said link means comprises a slot means for mating therewith.

3. A system according to claim 2 wherein said keying means extends beyond the terminals in any one of said cells for precluding an inadvertent shorting of said cell.

4. A system according to claim 1 wherein said arrangement includes an asymmetrical placement of a member of said keying means relative to the locations of the terminals in any one of said cells.

5. A system according to claim 4 wherein the terminals of any one of said cells project outwardly from said cell, and wherein said keying means has the form of a tooth which projects outwardly from said cell beyond the ends of said terminals to preclude an inadvertent simultaneous contacting of a positive one of said terminals and a negative one of said terminals in any one of said cells by said link means.

6. In a system for joining a plurality of electrochemical cells each having spaced apart positive and negative terminals, an improved linkage system comprising:
    a keying element positioned between the terminals of each of said cells, said keying element being configured to define adjacent connection-accommodating spaces between said element and respective ones of said terminals; and
    a conductive connector link configured to connect a terminal of one of said cells with a terminal of a second of said cells, said link having first and second end portions, said first portion being formed to be received by said keying element and only a first terminal of said terminals, said second portion being formed so as to be received by said keying element and only a second terminal of said terminals whereby the coupling between successive cells is keyed.

7. A system according to claim 6 wherein said keying element of one of said cells extends beyond the ends of the terminals of said cell to prevent an inadvertent simultaneous contacting of said terminals by said link.

8. A system according to claim 6 wherein said keying element is in the form of a tooth having a leg portion extending towards a first terminal of said cell, a part of said leg portion being formed with a chamfer to provide access to said first terminal by a tool utilized in connecting said link to said first terminal.

9. A system according to claim 6 wherein a first terminal and a second terminal of one of said cells are formed by threaded studs, and wherein said link is provided with apertures for encircling said studs, said link being secured to a stud by fastening means.

10. A system according to claim 6 wherein said keying element is in the form of a tooth configured to provide a relatively small space between said tooth and one of said terminals, and a relatively large space between said tooth and a second of said terminals in one of said cells;
    said first end portion of said link being sufficiently small to fit within the relatively small space between said tooth and said first terminal, said second end portion of said link being too large to fit within said space between said tooth and said first terminal, said second portion fitting within a space between said tooth and said second terminal.

11. A system according to claim 6 wherein said keying element is in the form of a tooth having side legs which project transversely of a plane containing first and second terminals of one of said cells to prevent an inadvertent simultaneous touching of said terminals by said link.

12. A system according to claim 11 wherein said first terminal and said second terminal are configured in the form of tabs, said tabs being bent to accommodate a welding of said tabs to said link, said link having a slot in one end thereof to mate with a leg of said tooth whereby said link and said tooth provide said keying of said coupling between successive ones of said cells.

13. A keyed battery linkage system for interconnection of a plurality of electrochemical cells comprising:
    a keying element located among the terminals in each of said cells, portions of said keying element being asymmetrically positioned relative to the terminals in each of said cells; and
    a connecting link adapted to be secured between terminals of a pair of said cells, said link being configured to fit in a prescribed sense between the keying elements and the terminals of said pair of cells for keying the coupling of successive ones of said cells in a series connection thereof.

14. A system according to claim 13 wherein said keying element is configured in the form of a tooth which extends beyond said terminals in each of said cells to prevent the inadvertent shorting of one of said cells.

15. A system according to claim 14 wherein a member of said tooth is asymmetrically positioned relative to the terminals of any one of said cells.

16. A system for linking a plurality of electrochemical cells wherein each of said cells has a first terminal and a second terminal located on a surface of the cell, said system comprising:
    an electrically conducting link for connecting a first terminal of one cell to a second terminal of a second cell of said plurality of cells; and
    a keying means located at said cell surface in each of said cells, said keying means being positioned relative to the terminals in each of said cells for engagement with said link upon the connecting of said link in a prescribed sense between said first terminal of said one cell and said second terminal of said second cell.

17. A system according to claim 16 wherein said first terminal and said second terminal are asymmetrically positioned relative to a center of said surface in each of said cells.

18. A system according to claim 16 or claim 17 wherein one end of said link is configured for mating only with said first terminal and said keying means in any one of said cells.

* * * * *